(12) United States Patent
Chang

(10) Patent No.: US 7,806,425 B2
(45) Date of Patent: Oct. 5, 2010

(54) TRAILER HITCH

(75) Inventor: Chin Shu Chang, Changhua (TW)

(73) Assignee: Vulcan Sports Co., Ltd., Changhua (TW)

( * ) Notice: Subject to any disclaimer, the term of this patent is extended or adjusted under 35 U.S.C. 154(b) by 103 days.

(21) Appl. No.: 12/289,052

(22) Filed: Oct. 20, 2008

(65) Prior Publication Data

US 2010/0096836 A1    Apr. 22, 2010

(51) Int. Cl.
   *B60D 1/60*    (2006.01)
(52) U.S. Cl. .................................. 280/507; 280/506
(58) Field of Classification Search ................ 280/504, 280/506, 507
   See application file for complete search history.

(56) References Cited

U.S. PATENT DOCUMENTS

| | | | | |
|---|---|---|---|---|
| 4,711,106 A * | 12/1987 | Johnson | ......................... | 70/34 |
| 6,334,561 B1 * | 1/2002 | Cole | ......................... | 224/521 |
| 6,364,339 B1 * | 4/2002 | Lee | ......................... | 280/507 |
| 6,402,181 B1 * | 6/2002 | Lee | ......................... | 280/507 |
| 6,409,203 B1 * | 6/2002 | Williams | ......................... | 280/506 |
| 6,575,000 B1 * | 6/2003 | Li | ......................... | 70/34 |
| 6,672,115 B2 * | 1/2004 | Wyers | ......................... | 70/14 |
| 6,733,029 B2 * | 5/2004 | McCoy et al. | ......................... | 280/506 |
| 6,773,200 B2 * | 8/2004 | Cole | ......................... | 403/378 |
| 6,829,915 B1 * | 12/2004 | Li | ......................... | 70/18 |
| 6,913,413 B2 * | 7/2005 | Yang | ......................... | 403/322.3 |
| 6,945,550 B2 * | 9/2005 | Williams | ......................... | 280/506 |
| 7,338,065 B1 * | 3/2008 | Clausen | ......................... | 280/507 |

* cited by examiner

*Primary Examiner*—Lesley Morris
*Assistant Examiner*—Marc A Scharich
(74) *Attorney, Agent, or Firm*—Rosenberg, Klein & Lee

(57) ABSTRACT

A trailer hitch having a retaining latch bolt to reduce shaking includes a locking head, a bolt seat, a retaining element, a latch bolt and an elastic element. The retaining element has a first directing rib to be rapidly positioned in a first bolt aperture of a first coupling member. The bolt seat has a positioning rib anchored in a second bolt aperture of a second coupling member to facilitate coupling of the first coupling member and the second coupling member. Hence the latch bolt can be coupled easily and adjustment of coupling tolerance can be performed as desired. Locking can be done to thwart pilferage of the trailer. And the latch bolt can be held firmly without sliding or shaking.

3 Claims, 4 Drawing Sheets

TRAILER HITCH

BACKGROUND OF THE INVENTION

1. Field of the Invention

The present invention relates to a trailer hitch and particularly to a trailer hitch that has a retaining latch bolt to reduce shaking to prevent pilferage and stabilize the latch bolt without sliding.

2. Description of the Prior Art

U.S. Pat. No. 6,409,203 discloses a trailer hitch which mainly includes a latch bolt 11, a retaining element 12 and a locking head 13 (referring to FIG. 1). The retaining element 12 is coupled with an elastic element 14 and held in a first coupling member 21. The retaining element 12 has a screw hole 121 corresponding to a first bolt opening 211 of the first coupling member 21. It also has a second coupling member 22 to be coupled with the first coupling member 21. The second coupling member 22 has a second bolt opening 221 corresponding to the first bolt opening 211 to allow the latch bolt 11 to run through. Incorporating with the locking head 13 a locking operation can be performed. To avoid the latch bolt 11 from sliding and shaking while the trailer is moving on a bumpy road, an external thread section 111 is formed on the latch bolt 11 to screw with the screw hole 121 of the retaining element 12. The coupling tolerance of the latch bolt 11 can be adjusted. The elastic element 14 also provides a thrusting force to reduce sliding and shaking of the latch bolt 11. Although the aforesaid structure can thwart pilferage and prevent the latch bolt 11 from sliding and shaking, it still has drawbacks in practice, notably:

1. The retaining element 12 is held in the first coupling member 21 which has no anchoring means, hence alignment of the first bolt opening 211 and the screw hole 121 is difficult. Coupling of the latch bolt 11 could be hindered.

2. When the latch bolt 11 runs through sequentially the second bolt opening 221, first bolt opening 211 and screw hole 121, the retaining element 12 is prone to be pushed and moved, thus coupling is more difficult.

3. The external thread section 111 of the latch bolt 11 is screwed with the screw hole 121 of the retaining element 12, hence the front section 112 of the latch bolt 11 cannot be made too large. A bushing 3 has to be provided on the front section 112 to reduce the tolerance of the latch bolt 11 and the first and second bolt openings 211 and 221 (a larger tolerance will result in greater sliding and shaking).

4. To facilitate screwing adjustment of the external thread section 111 and the screw hole 121, a grip section has to be provided on the bolt head 110 to be clamped by a tool. After locking, the bolt head 110 can be easily broken to damage the lock by ill-intentioned people.

SUMMARY OF THE INVENTION

In view of the aforesaid problems, the primary object of the present invention is to provide a trailer hitch that has a retaining latch bolt to reduce shaking. The trailer hitch according to the invention includes a locking head, a bolt seat, a retaining element, a latch bolt and an elastic element. The retaining element has a first directing rib to facilitate fast positioning in a first bolt aperture of a first coupling member. The bolt seat has a positioning rib at one end to be anchored in a second bolt aperture of a second coupling member to facilitate coupling of the first and second coupling members. Thus the latch bolt can easily run through the bolt apertures, and the tolerance formed thereon can be adjusted and locking operation can be accomplished easier. All this can improve theft-thwarting effect and prevent the latch bolt from sliding and shaking.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
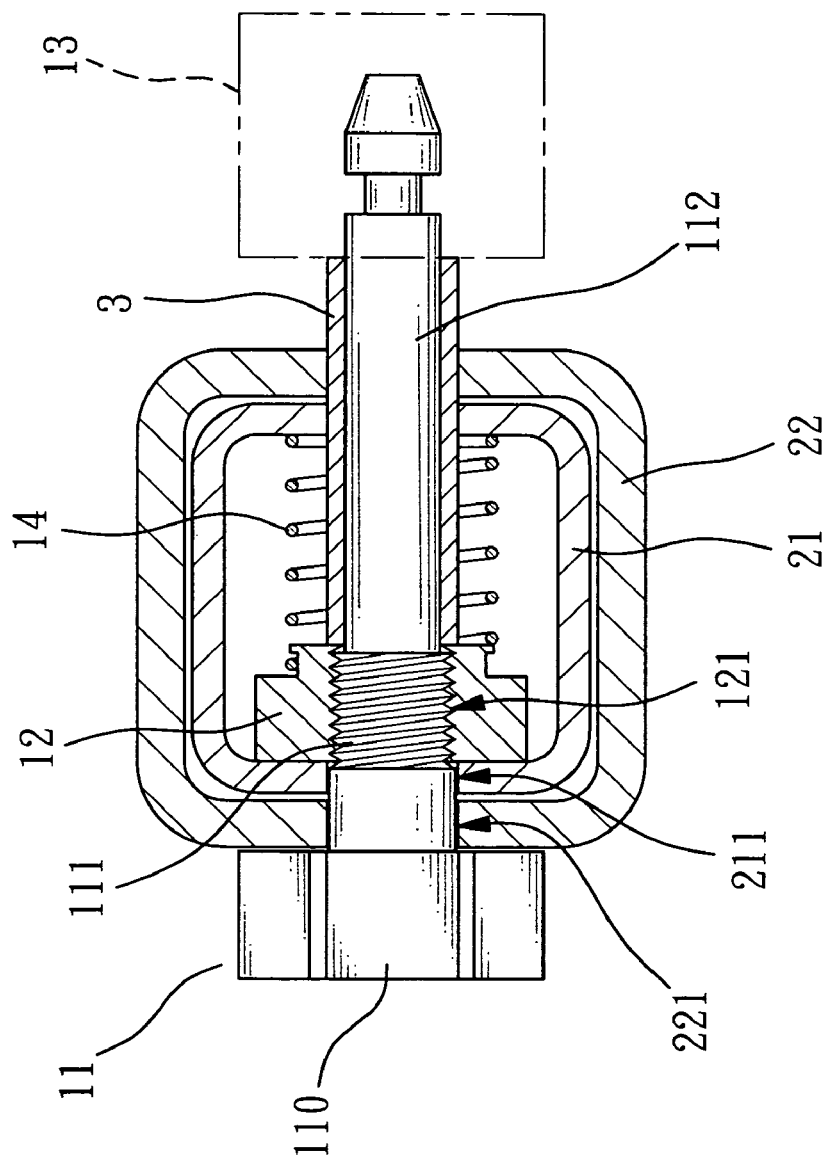
FIG. 1 is a sectional view of a conventional trailer hitch.
Figure 2:
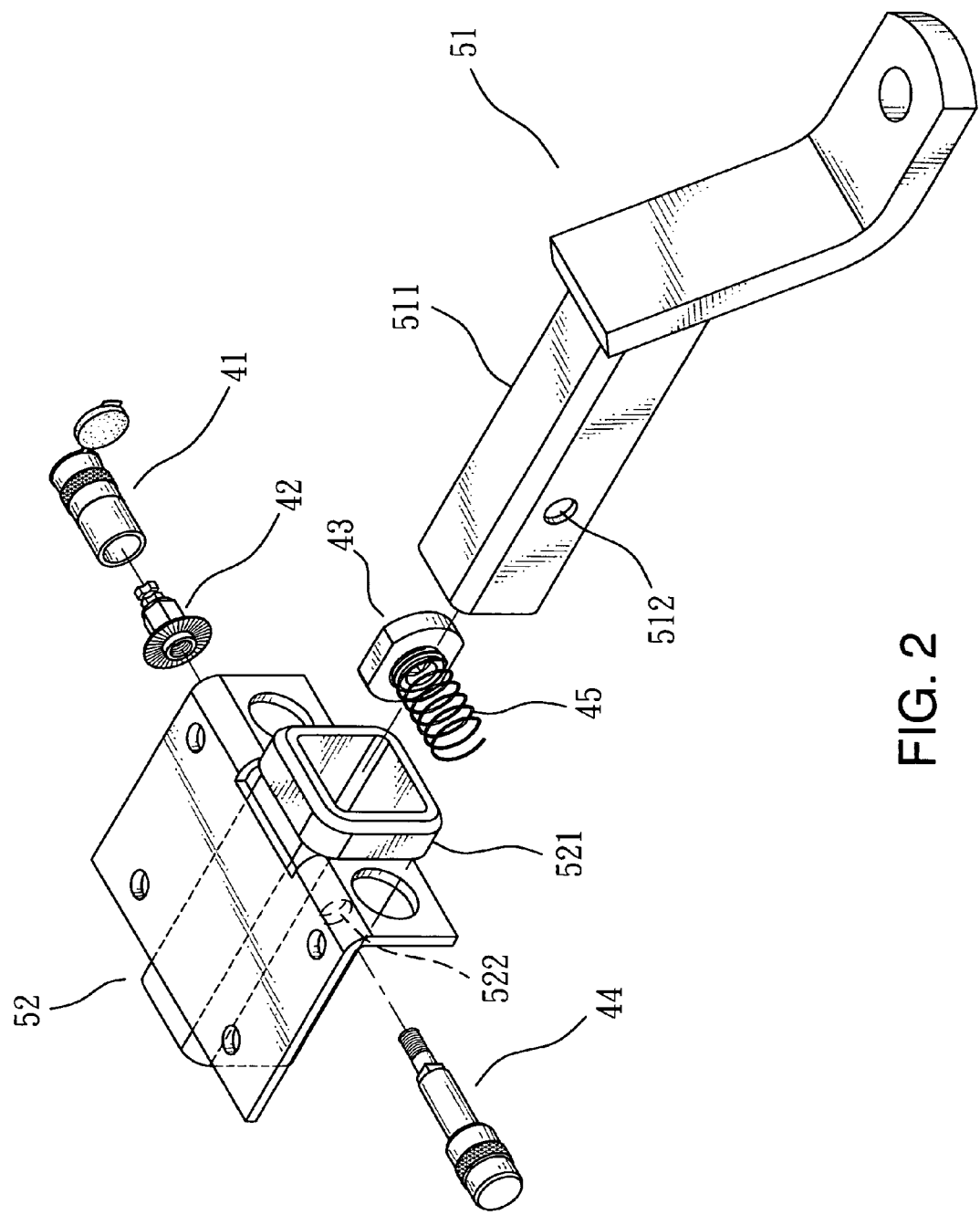
FIG. 2 is a perspective view of an embodiment of the invention.
Figure 3:
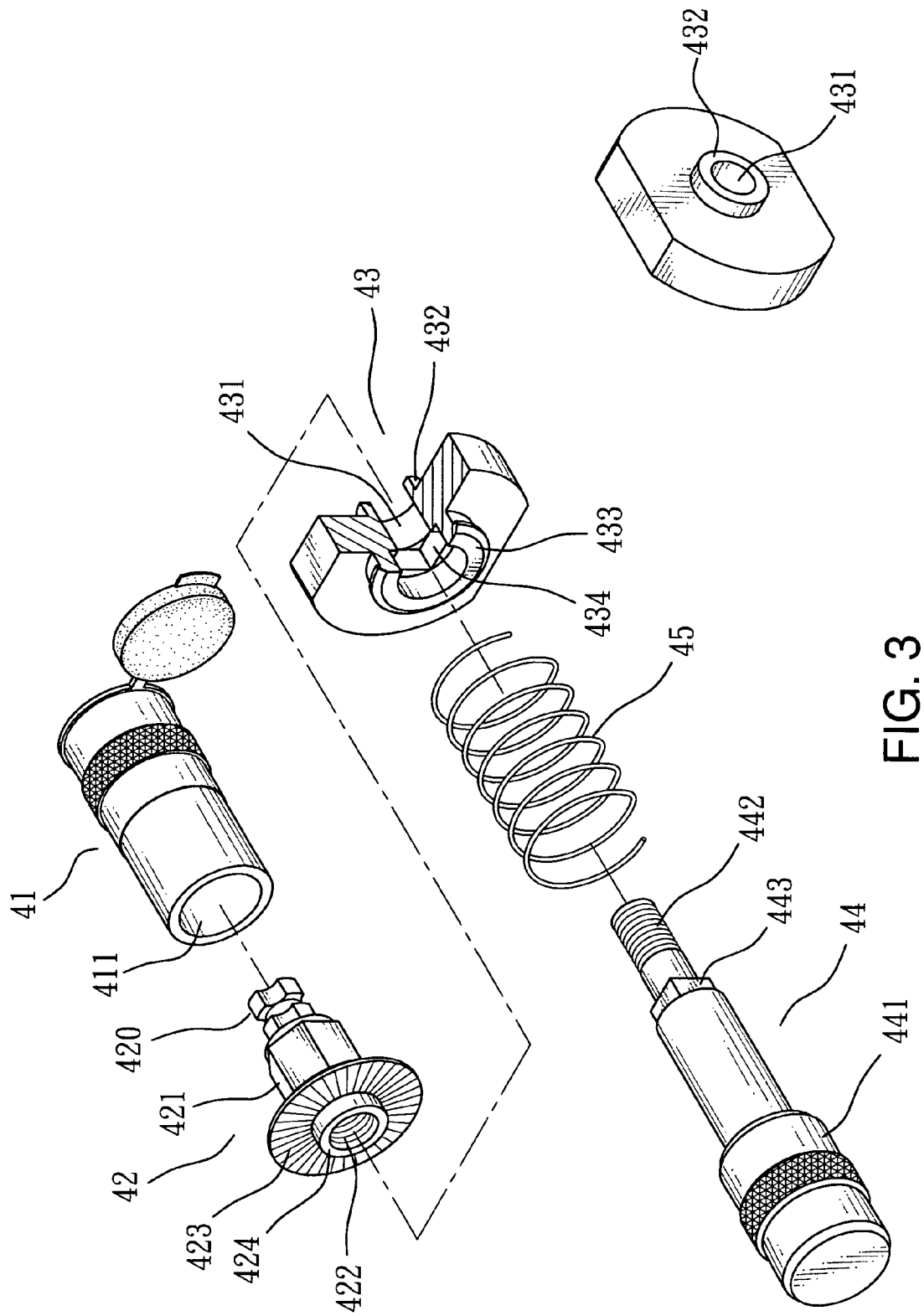
FIG. 3 is an exploded view of the invention.
Figure 4:
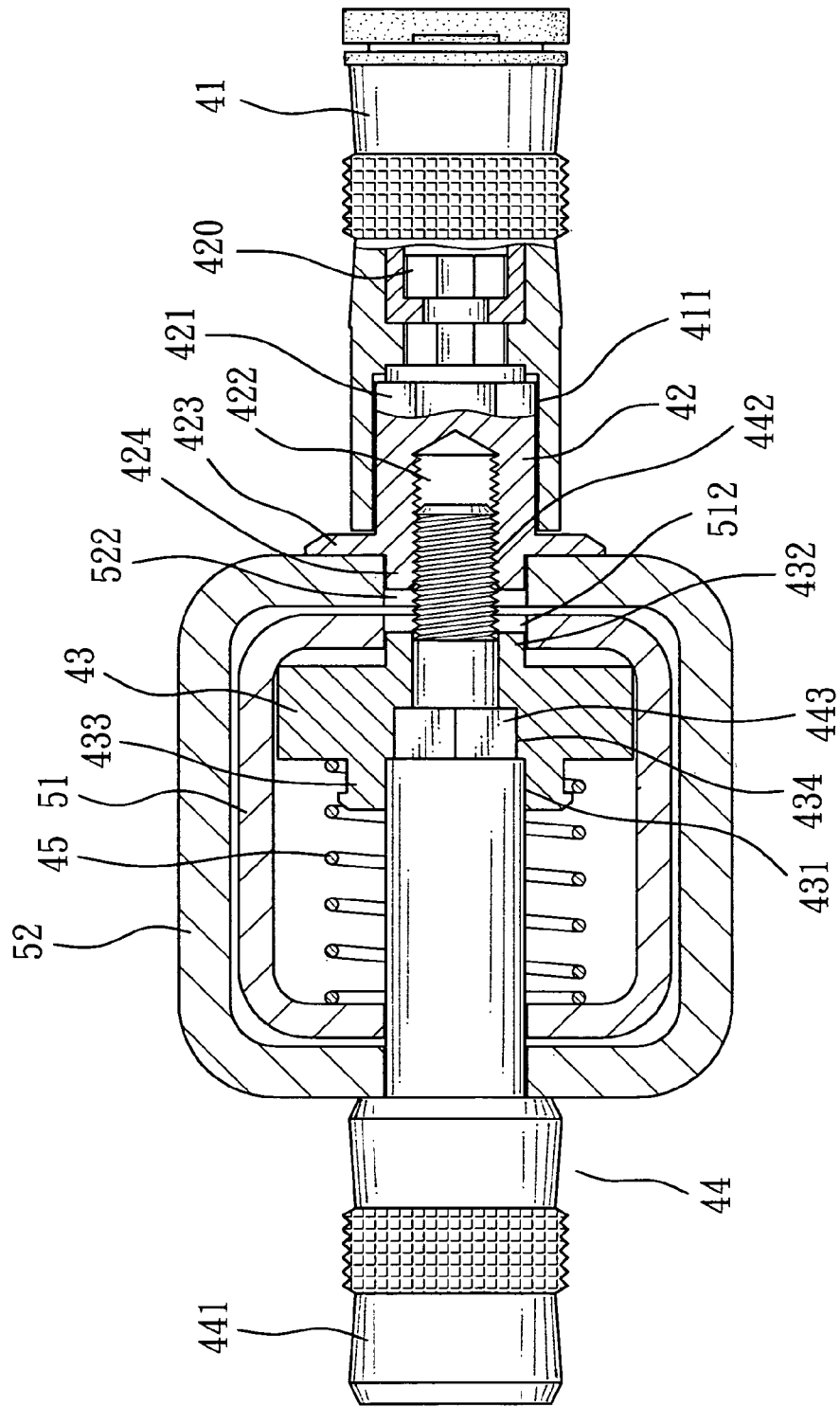
FIG. 4 is a sectional view of an embodiment of the invention.

Please referring to FIGS. 2 through 4, the trailer hitch according to the invention includes a locking head 41, a bolt seat 42, a retaining element 43, a latch bolt 44 and an elastic element 45 to lock a first coupling member 51 of a trailer and a second coupling member 52 of a vehicle after they have been hitched.

The first coupling member 51 has a shank 511 run through by a first bolt aperture 512.

The second coupling member 52 has a bushing 521 run through by a second bolt aperture 522.

The locking head 41 has a core (known in the art, thus is not shown in the drawings) and a bolt opening 411 formed at one end thereof.

The bolt seat 42 has a bolt section 420 and an action section 421 at one end to be held in the bolt opening 411 and a detent plate 423 and a screw hole 422 at another end. It also has a positioning rib 424 extended outwards from the rim of the screw hole 422.

The retaining element 43 has a body run through by a hole 431, a first directing rib 432 and a second directing rib 433 jutting from two ends of the hole 431. The hole 431 has a retaining section 434 formed thereon.

The latch bolt 44 has a bolt head 441 at one end and an external thread portion 442 at other end and a retaining portion 443 corresponding to the retaining section 434 to form a latched coupling.

The elastic element 45 is coupled on the second directing rib 433.

By means of the construction set forth above, referring to FIG. 4, when in use the remaining element 43 is coupled on the first coupling member 51 and anchored in the first bolt aperture 512 through the first directing rib 432 without sliding. The shank 511 of the first coupling member 51 can be coupled with bushing 521 of the second coupling member 52. To lock the trailer hitch, first align the first bolt aperture 512 with the second bolt aperture 522, then run the latch bolt 44 through, in this order the second bolt aperture 522, first bolt aperture 512, and hole 431. The retaining section 434 of the retaining element 43 can be coupled and latched with the retaining portion 443 of the latch bolt 44, and adjustment of the coupling tolerance can be accomplished by screwing of the external thread portion 442 of the latch bolt 44 and the screw hole 422 of the bolt seat 42 so that the bolt head 441 can be positioned in close contact with the second coupling member 52 to harness sliding of the latch bolt 44. Then the bolt opening 411 of the locking head 41 and the bolt section 420 and action section 421 of the bolt seat 42 can be coupled, and locking can be performed (the technique is known in the art, thus details are omitted herein). In addition, the screwing between the screw hole 422 and the external thread portion 442 can be made by turning the action section 421 through user's fingers or a wrenching tool to adjust the coupling tolerance of the latch bolt 44. The action section 421 is hidden in the bolt opening 411 after locking is finished (referring to FIG. 4). Thus it can protect the trailer hitch from pilferage and overcome the shortcomings of the conventional techniques.

As a conclusion, the invention provides a simple structure and makes coupling and locking easier, and also overcomes the sliding and shaking problems occurred to the conventional anchor member. It offers a significant improvement over the conventional trailer hitches.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. A trailer hitch comprising:
    a first coupling member of a trailer and a second coupling member of a vehicle, the first coupling member having first coupling apertures and the second coupling member having second coupling apertures;
    a locking mechanism extending through the first and second coupling apertures in the first and second coupling members for locking the first and second coupling members together after being hitched, wherein the locking mechanism includes: a locking head, a bolt seat, a retaining element, a latch bolt and an elastic element, wherein:
    the locking head has a core and a bolt opening formed at one end thereof;
    the bolt seat has a bolt section and an action section at one end thereof to be inserted and held into the bolt opening, a screw hole at another end thereof, and a positioning rib extending outwards from a rim of the screw hole to be inserted into one of the second coupling apertures;
    the retaining element is configured to be located internally of the first coupling member and has a body, a hole extending through the body to receive at least a portion of the latch bolt, and a first directing rib and a second directing rib jutting respectively from two opposite rims of the hole, the first directing rib for being inserted into one of the first coupling apertures;
    the latch bolt has a bolt head at one end and an external thread portion at another end and a retaining portion adjacent to the external thread portion; and
    the elastic element is coupled on the second directing rib.

2. The trailer hitch of claim 1, wherein the bolt seat has a detent plate at the other end which surrounds the screw hole.

3. The trailer hitch of claim 1, wherein the hole of the retaining element has a retaining section shaped to correspond with the retaining portion of the latch bolt for mating with each other.

* * * * *